(12) United States Patent
Jiao et al.

(10) Patent No.: US 8,345,053 B2
(45) Date of Patent: Jan. 1, 2013

(54) GRAPHICS PROCESSORS WITH PARALLEL SCHEDULING AND EXECUTION OF THREADS

(75) Inventors: Guofang Jiao, San Diego, CA (US); Yun Du, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 11/533,880

(22) Filed: Sep. 21, 2006

(65) Prior Publication Data

US 2008/0074433 A1 Mar. 27, 2008

(51) Int. Cl.
*G06F 15/80* (2006.01)
*G06F 15/00* (2006.01)
*G06T 1/00* (2006.01)

(52) U.S. Cl. ........................................ 345/505; 345/501
(58) Field of Classification Search .................. 345/502, 345/505, 501, 503, 504, 506, 519; 718/102, 718/103, 104
See application file for complete search history.

(56) References Cited

U.S. PATENT DOCUMENTS

| | | | |
|---|---|---|---|
| 6,069,705 A | 5/2000 | Suvarna | |
| 6,972,769 B1 | 12/2005 | Nebeker et al. | |
| 7,015,913 B1* | 3/2006 | Lindholm et al. | 345/501 |
| 2004/0172631 A1* | 9/2004 | Howard | 718/100 |
| 2005/0146529 A1* | 7/2005 | Perego | 345/542 |
| 2005/0184994 A1* | 8/2005 | Suzuoki et al. | 345/502 |
| 2006/0174094 A1* | 8/2006 | Lloyd et al. | 712/226 |
| 2006/0282826 A1* | 12/2006 | Dockser | 717/127 |
| 2007/0030278 A1* | 2/2007 | Prokopenko et al. | 345/506 |
| 2007/0273698 A1* | 11/2007 | Du et al. | 345/501 |
| 2007/0288726 A1* | 12/2007 | Luick | 712/225 |

FOREIGN PATENT DOCUMENTS

| | | |
|---|---|---|
| EP | 0473444 | 3/1992 |
| EP | 1365321 | 11/2003 |

OTHER PUBLICATIONS

Hampton et al., "Multiprocessor APS Simplify Calculations for Image Processing", Computer Technology Review, Westworold Production, Beverly Hills, CA, US 1986, pp. 41-42,44, xp000572962.
International Search Report—PCT/US07/079087—International Search Authority—European Patent Office, Feb. 5, 2008.
Written Opinion—PCT/US2007/079087 International Search Authority European Patent Office Feb. 5, 2008.

* cited by examiner

*Primary Examiner* — Jacinta M Crawford
(74) *Attorney, Agent, or Firm* — Matthew J. Evans; James R. Gambale, Jr.

(57) ABSTRACT

A graphics processor capable of parallel scheduling and execution of multiple threads, and techniques for achieving parallel scheduling and execution, are described. The graphics processor may include multiple hardware units and a scheduler. The hardware units are operable in parallel, with each hardware unit supporting a respective set of operations. The hardware units may include an ALU core, an elementary function core, a logic core, a texture sampler, a load control unit, some other hardware unit, or a combination thereof. The scheduler dispatches instructions for multiple threads to the hardware units concurrently. The graphics processor may further include an instruction cache to store instructions for threads and register banks to store data. The instruction cache and register banks may be shared by the hardware units.

30 Claims, 9 Drawing Sheets

| Register Address | Register Bank 1 720a | | | | Register Bank 2 720b | | | | Register Bank 3 720c | | | | Register Bank 4 720d | | | |
|---|---|---|---|---|---|---|---|---|---|---|---|---|---|---|---|---|
| | \multicolumn{4}{c}{Thread 1} | \multicolumn{4}{c}{Thread 2} | \multicolumn{4}{c}{Thread 3} | \multicolumn{4}{c}{Thread 4} | ... |

| Reg Addr | \multicolumn{16}{c}{Thread 1 — Thread 2 — Thread 3 — Thread 4} | ... |
|---|---|---|

Figure 8 — Register file layout across four banks (720a–720d) and four threads:

| Addr | Bank 1 | Bank 2 | Bank 3 | Bank 4 |
|---|---|---|---|---|
| Thread 1 | | | | |
| 1 | P0.X P1.X P2.X P3.X | P0.Y P1.Y P2.Y P3.Y | P0.Z P1.Z P2.Z P3.Z | P0.W P1.W P2.W P3.W |
| 2 | P0.R P1.R P2.R P3.R | P0.G P1.G P2.G P3.G | P0.B P1.B P2.B P3.B | P0.A P1.A P2.A P3.A |
| 3 | P0.u0/P1.u0/P2.u0/P3.u0 | P0.v0/P1.v0/P2.v0/P3.v0 | P0.u1/P1.u1/P2.u1/P3.u1 | P0.v1/P1.v1/P2.v1/P3.v1 |
| 4 | P0.u2/P1.u2/P2.u2/P3.u2 | P0.v2/P1.v2/P2.v2/P3.v2 | P0.u3/P1.u3/P2.u3/P3.u3 | P0.v3/P1.v3/P2.v3/P3.v3 |
| Thread 2 | | | | |
| 5 | P0.X P1.X P2.X P3.X | P0.Y P1.Y P2.Y P3.Y | P0.Z P1.Z P2.Z P3.Z | P0.W P1.W P2.W P3.W |
| 6 | P0.R P1.R P2.R P3.R | P0.G P1.G P2.G P3.G | P0.B P1.B P2.B P3.B | P0.A P1.A P2.A P3.A |
| 7 | P0.u0/P1.u0/P2.u0/P3.u0 | P0.v0/P1.v0/P2.v0/P3.v0 | P0.u1/P1.u1/P2.u1/P3.u1 | P0.v1/P1.v1/P2.v1/P3.v1 |
| 8 | P0.u2/P1.u2/P2.u2/P3.u2 | P0.v2/P1.v2/P2.v2/P3.v2 | P0.u3/P1.u3/P2.u3/P3.u3 | P0.v3/P1.v3/P2.v3/P3.v3 |
| Thread 3 | | | | |
| 9 | P0.X P1.X P2.X P3.X | P0.Y P1.Y P2.Y P3.Y | P0.Z P1.Z P2.Z P3.Z | P0.W P1.W P2.W P3.W |
| 10 | P0.R P1.R P2.R P3.R | P0.G P1.G P2.G P3.G | P0.B P1.B P2.B P3.B | P0.A P1.A P2.A P3.A |
| 11 | P0.u0/P1.u0/P2.u0/P3.u0 | P0.v0/P1.v0/P2.v0/P3.v0 | P0.u1/P1.u1/P2.u1/P3.u1 | P0.v1/P1.v1/P2.v1/P3.v1 |
| 12 | P0.u2/P1.u2/P2.u2/P3.u2 | P0.v2/P1.v2/P2.v2/P3.v2 | P0.u3/P1.u3/P2.u3/P3.u3 | P0.v3/P1.v3/P2.v3/P3.v3 |
| Thread 4 | | | | |
| 13 | P0.X P1.X P2.X P3.X | P0.Y P1.Y P2.Y P3.Y | P0.Z P1.Z P2.Z P3.Z | P0.W P1.W P2.W P3.W |
| 14 | P0.R P1.R P2.R P3.R | P0.G P1.G P2.G P3.G | P0.B P1.B P2.B P3.B | P0.A P1.A P2.A P3.A |
| 15 | P0.u0/P1.u0/P2.u0/P3.u0 | P0.v0/P1.v0/P2.v0/P3.v0 | P0.u1/P1.u1/P2.u1/P3.u1 | P0.v1/P1.v1/P2.v1/P3.v1 |
| 16 | P0.u2/P1.u2/P2.u2/P3.u2 | P0.v2/P1.v2/P2.v2/P3.v2 | P0.u3/P1.u3/P2.u3/P3.u3 | P0.v3/P1.v3/P2.v3/P3.v3 |
| ... | ... | ... | ... | ... |

GRAPHICS PROCESSORS WITH PARALLEL SCHEDULING AND EXECUTION OF THREADS

BACKGROUND

I. Field

The present disclosure relates generally to electronics, and more specifically to graphics processors.

II. Background

Graphics processors are widely used to render 2-dimensional (2-D) and 3-dimensional (3-D) images for various applications such as video games, graphics, computer-aided design (CAD), simulation and visualization tools, imaging, etc. A graphics processor may perform computationally intensive processing on large amount of graphics data to render an image. For example, a 3-D image may be represented with many triangles (e.g., in the millions), and each triangle may be defined by three vertices. Each vertex may be associated with various attributes such as space coordinates, color values, and texture coordinates, and each attribute may have up to four components. The graphics processor may render each triangle by determining the values of the components of each picture element (pixel) within the triangle. The graphics operations and the large quantity of data may require high processing capability for acceptable performance.

In order to achieve higher processing throughput, a graphics processor may include multiple shader units and/or multiple arithmetic logic units (ALUs). Depending on the processor design, co-issue and/or dual-issue of instructions for the same thread of execution (or simply, thread) may be supported. Co-issue refers to execution of two instructions for the same thread in parallel by two processing units on the same clock cycle. Dual-issue refers to execution of two instructions for the same thread in a pipelined manner by two processing units. A combination of dual-issue and co-issue may also be supported.

Co-issue and dual-issue techniques are challenging to implement. A compiler would need to identify and address hardware restrictions, memory read/write conflicts, etc. Furthermore, co-issue may not be applicable for every type of instruction, and dual-issue may result in other limitations such as heavy usage of register file ports and data dependency. Co-issue and dual-issue typically complicate the design of the scheduler and may further result in wider instruction words.

SUMMARY

A graphics processor capable of parallel scheduling and execution of multiple threads, and techniques for achieving parallel scheduling and execution, are described herein. The graphics processor may include multiple hardware units and a scheduler. The hardware units are operable in parallel, with each hardware unit supporting a respective set of operations. The hardware units may include an ALU core, an elementary function core, a logic core, a texture sampler, a load control unit, some other hardware unit, or a combination thereof. The scheduler dispatches instructions for multiple threads to the hardware units concurrently. The graphics processor may further include an instruction cache to store instructions for threads and register banks to store data. The instruction cache and register banks may be shared by the hardware units.

Various aspects and features of the disclosure are described in further detail below.

DETAILED DESCRIPTION

Figure 1:
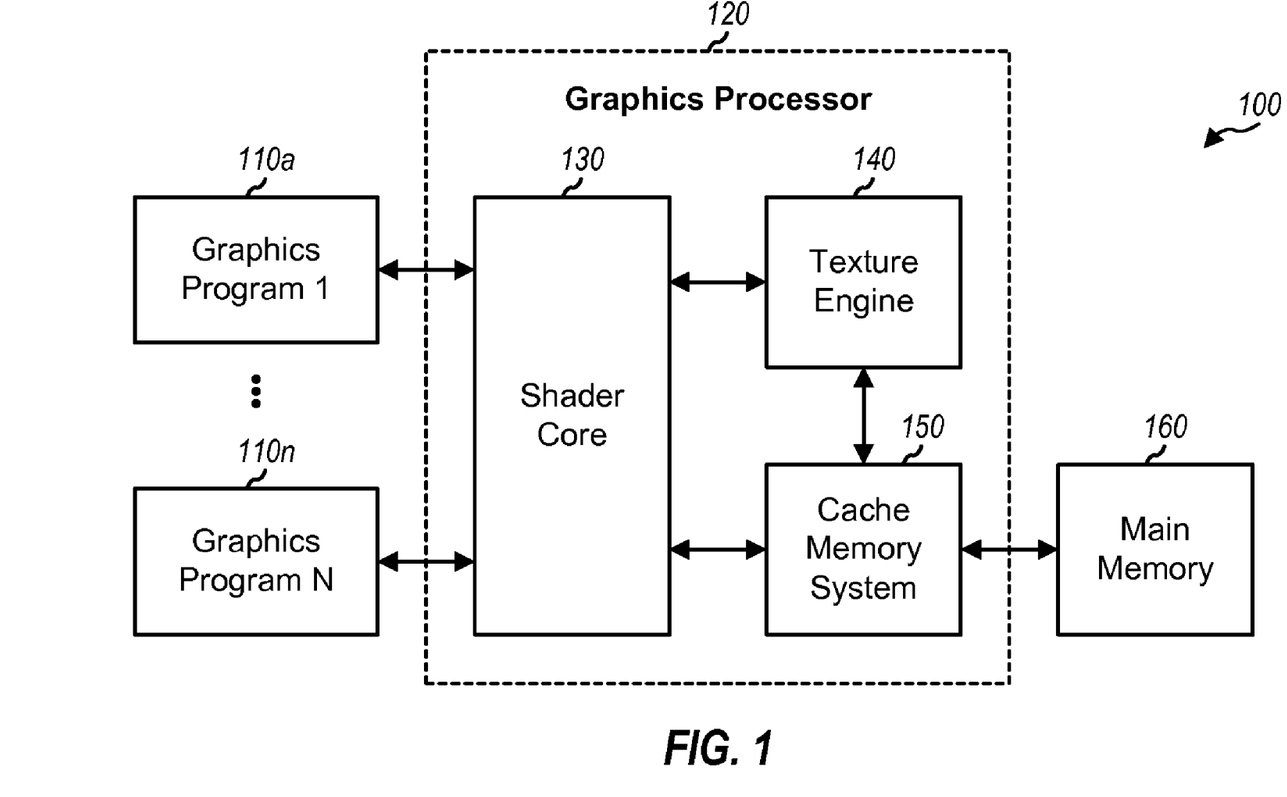
FIG. 1 shows a graphics system.

FIG. 1 shows a block diagram of a graphics system 100, which may be a stand-alone system or part of a larger system such as a computing system, a wireless communication device (e.g., a cellular phone), etc. Graphics system 100 supports N graphics programs/applications 110a through 110n, where N may be any integer value. Programs 110a through 110n may execute in parallel and may be for video games, graphics, and/or other applications.

A graphics processor 120 performs processing for programs 110a through 110n. Graphics processor 120 may split the processing of each program into a series of threads, e.g., automatically and transparent to the program. A thread (or thread of execution) may indicate a specific task that may be performed with a set of one or more instructions. Threads allow a program to have multiple tasks performed simultaneously by different units and further allow different programs to share resources.

In FIG. 1, graphics processor 120 includes a shader core 130, a texture engine 140, and a cache memory system 150. A core generally refers to a processing unit within an integrated circuit. The terms "core", "engine", "machine", "processor" and "processing unit" are often used interchangeably. Shader core 130 may perform graphics operations such as shading, which is a highly complex graphics operation involving lighting, shadowing, etc. Texture engine 140 may perform graphics operations such as texture mapping, which is another complex graphics operation involving modification of the color of pixels with the color of a texture image. Cache memory system 150 may include one or more caches, which are fast memories that can store instructions and/or data for shader core 130 and texture engine 140. Graphics processor 120 may include other processing and control units, engines, and memories, which are not shown in FIG. 1 for simplicity. Graphics processor 120 may also implement a software interface such as Open Graphics Library (OpenGL), Direct3D, etc. OpenGL is described in a document entitled "The OpenGL® Graphics System: A Specification," Version 2.0, dated Oct. 22, 2004, which is publicly available.

A main memory 160 is a large, slower memory located further away (e.g., off-chip) from graphics processor 120. Main memory 160 stores instructions and data that may be loaded into the caches within cache memory system 150. Main memory 160 may store all programs being executed by graphics processor 120.

Figure 2:
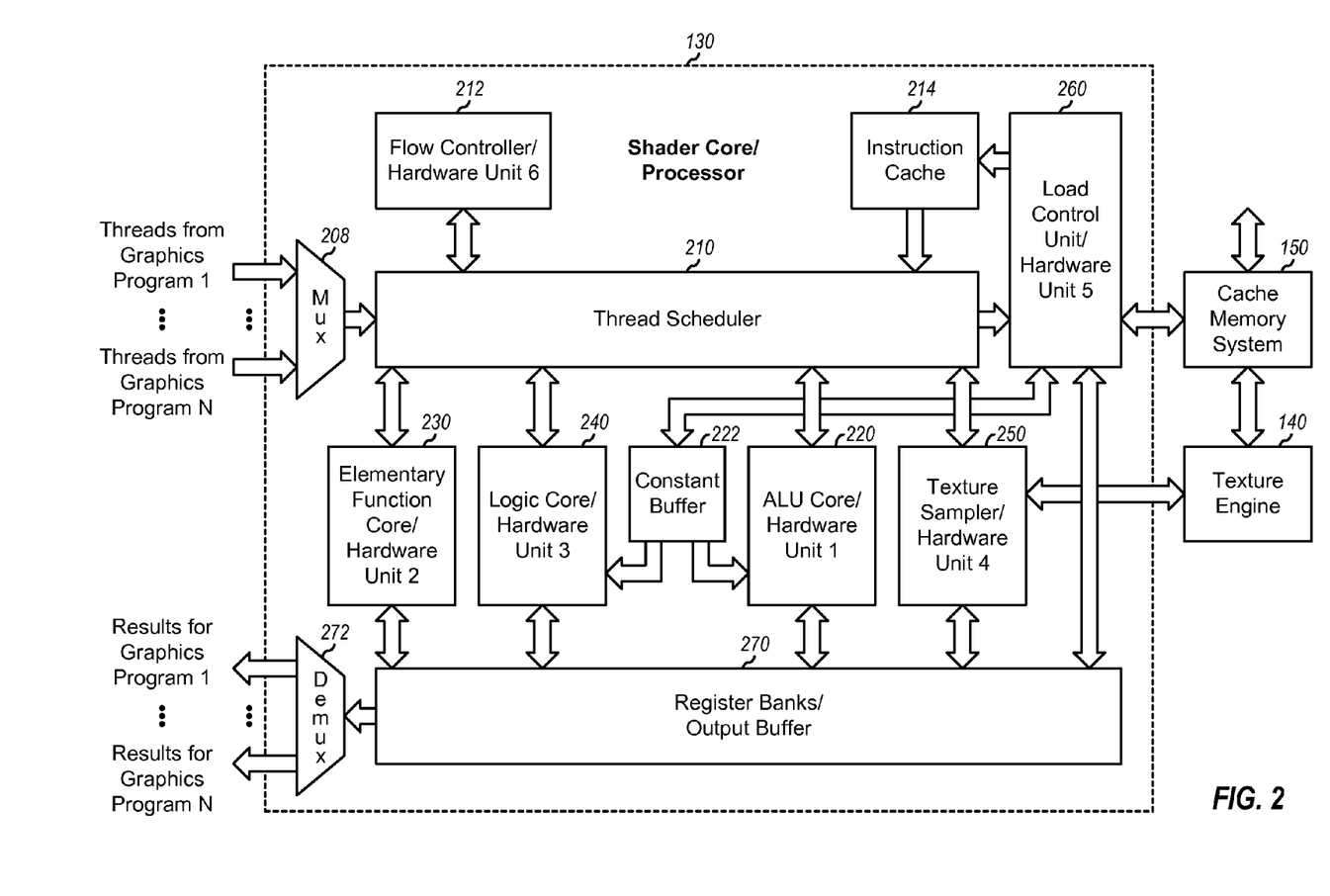
FIG. 2 shows a shader core within the graphics system.

FIG. 2 shows a block diagram of a design of shader core 130 in FIG. 1. Within shader core 130, a multiplexer (Mux) 208 receives threads from programs 110a through 110n and provides these threads to a thread scheduler 210. Thread scheduler 210 performs various functions to schedule and manage execution of the threads, as described below. A flow controller 212 assists with program flow control for the threads. An instruction cache 214 stores instructions for the threads. These instructions indicate specific operations to perform for each thread. Each operation may be an arithmetic operation, an elementary function, a logic operation, a memory access operation, etc. Instruction cache 214 may be loaded with instructions from cache memory system 150 and/or main memory 160, as needed, via a load control unit 260.

An ALU core 220 may perform arithmetic operations such as addition (ADD), subtraction (SUB), multiplication (MUL), multiply and accumulate (MAD), dot product (DPn), absolute, negation, comparison, saturation, etc. ALU core 220 may comprise one or more scalar ALUs and/or one or more vector ALUs. A scalar ALU can operate on one component of one pixel at a time. A vector ALU can operate on multiple (e.g., all four) components of one pixel at a time.

An elementary function core 230 may compute transcendental elementary functions such as sine (SIN), cosine (COS), reciprocal (RCP), logarithm (LOG), exponential (EXP), square root (SQR), reciprocal square root (RSQ), etc, which are widely used in shader instructions. Elementary function core 230 may improve shader performance by computing the elementary functions in much less time than the time required to perform polynomial approximations of the elementary functions using simple instructions. Elementary function core 230 may comprise one or more elementary function units. Each elementary function unit can compute an elementary function for one component of one pixel at a time.

A logic core 240 may perform logical operations (e.g., AND, OR, XOR, etc.), bitwise operations (e.g., left and right shifts), integer operations, comparison, data buffer management operations (e.g., push, pop, etc.), and/or other operations. Logic core 240 may also perform format conversion, e.g., from integers to floating point numbers, and vice versa. A constant buffer 222 may store constant values (e.g., scale factors, filter weights, etc.) used by ALU core 220 and logic core 240.

A texture sampler 250 may perform pre-processing for texture engine 140. For example, texture sampler 250 may read texture coordinates from register banks 270, attach sampler code and/or other information, and send its output to texture engine 140. Texture sampler 250 may also provide instructions to texture engine 140 and receive results from the texture engine.

Load control unit 260 may control the loading of instructions, constants, and data for various units within shader core 130. Load control unit 260 interfaces with cache memory system 150 and loads instruction cache 214, constant buffer 222, and register banks/output buffer 270 with instructions and/or data from cache memory system 150. Load control unit 260 also writes the data in register banks 270 to cache memory system 150. Register banks 270 store intermediate results and final results from ALU core 220, elementary function core 230, logic core 240, texture sampler 250, and load control unit 260. A demultiplexer (Demux) 272 receives the final results for the executed threads from register banks 270 and provides these results to programs 110a through 110n.

An instruction is typically executed in multiple pipeline stages, with the number of stages being dependent on the hardware design and the instruction type. Different types of instructions typically operate differently and utilize different resources. For example, when a thread executes an instruction for ADD, MUL, MAD, or DPn, the ALU core may be active while other processing units may be idle. Overall utilization of the processing units may be low if there is interdependency among the processing units, e.g., the result from one unit is used by another unit.

Shader core 130 may be partitioned into multiple hardware units to support parallel execution of instructions and improve efficiency. In the design shown in FIG. 2, shader core 130 includes six hardware units, with hardware unit 1 corresponding to ALU core 220, hardware unit 2 corresponding to elementary function core 230, hardware unit 3 corresponding to logic core 240, hardware unit 4 corresponding to texture sampler 250, hardware unit 5 corresponding to load control unit 260, and hardware unit 6 corresponding to flow controller 212. In general, any number of hardware units may be defined, and each hardware unit may perform any designated set of operations.

Each hardware unit may operate independently of the other hardware units. Each hardware unit may include any number of processing blocks that may be shared for different operations supported by that hardware unit. For example, ALU core 220 may include adders and multipliers that may be shared for ADD, MUL, DP4 and MAD operations. Processing blocks are generally not shared between hardware units in order to maintain independence among the hardware units. The hardware units may be operated in parallel to execute different instructions at the same time. Thread scheduler 210 may determine which hardware unit to use for each instruction, as described below. Thread scheduler 210 may then issue different instructions to different hardware units for execution in parallel, which may significantly increase throughput.

Multi-threading may be used to improve parallelism. Thread scheduler 210 may determine which threads are ready for execution and may dispatch these threads to different hardware units. Thread scheduler 210 may manage execution of the threads and utilization of the hardware units.

Figure 3:
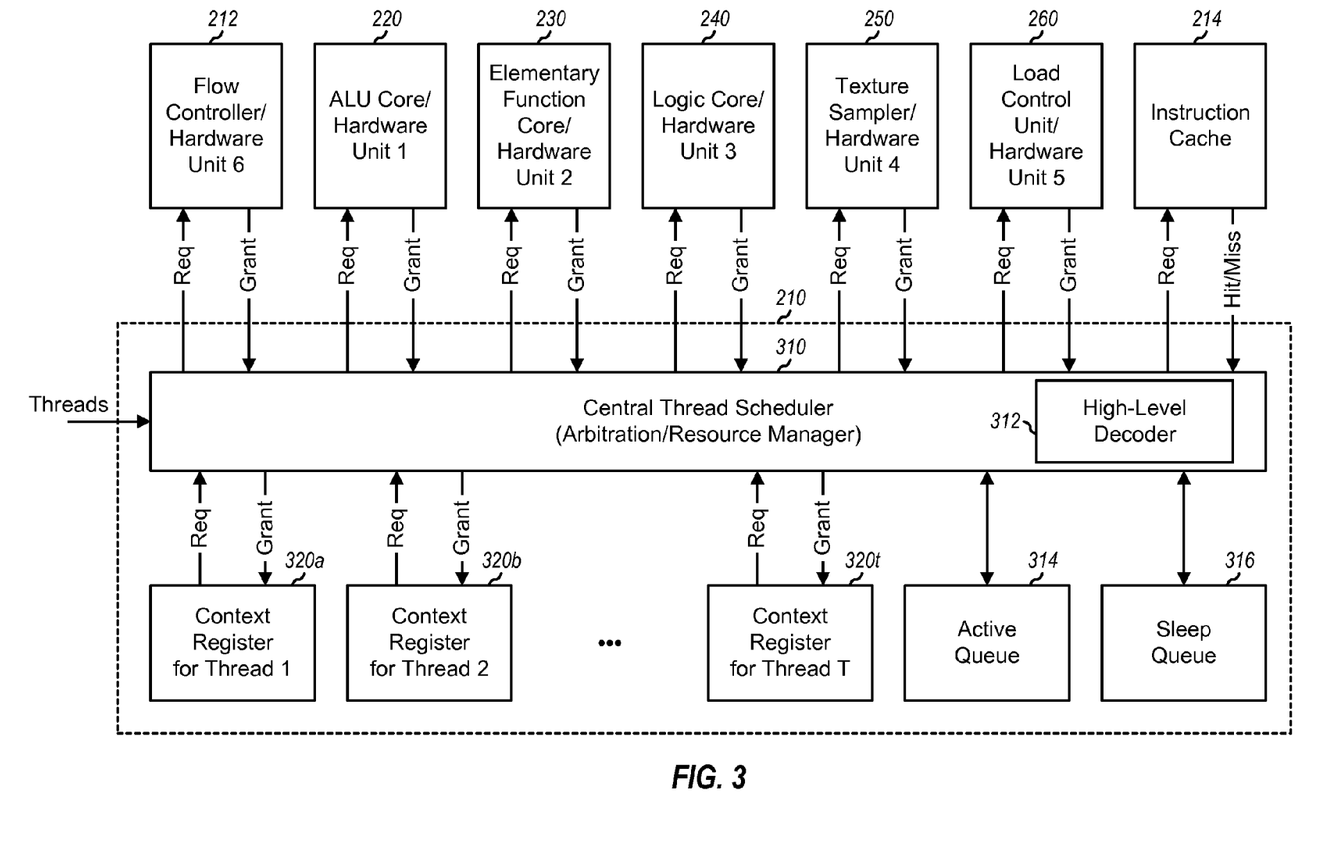
FIG. 3 shows a thread scheduler within the shader core.

FIG. 3 shows a block diagram of a design of thread scheduler 210 in FIG. 2. In this design, thread scheduler 210 includes a central thread scheduler 310, an active queue 314, a sleep queue 316, and T context registers 320a through 320t for T threads, where T may be any value. Context registers 320 may be implemented with various storage structures, e.g., registers, RAM, etc. For simplicity, FIG. 3 shows central thread scheduler 310 communicating with context registers 320, flow controller 212, and hardware units 210 through 260 via request (Req) and grant interfaces. In general, communication between these units may be achieved with various mechanisms such as, e.g., control signals, messages, registers, etc.

Two-level decoding of instructions may be performed to improve performance. A high-level decoder 312 within central thread scheduler 310 may perform high-level decoding of instructions to determine instruction type, operand type, source and destination identifiers (IDs), etc., which may be used for scheduling. Scheduler 310 performs scheduling and determines which instructions to dispatch to the hardware units. Scheduler 310 may perform the following:

Determine which hardware unit to use for each instruction, which may be efficiently achieved using hardware identifiers as described below, Check for dependency among instructions, Check for potential read/write conflicts of register banks 270, and Check for hardware unit conflicts and arbitrate among candidate threads.

Each hardware unit may also include its own instruction decoder that performs low-level decoding of instructions, as described below. The instruction decoder for each hardware unit may operate on instructions executed by that hardware unit, which may be a subset of all instructions supported by shader core 130. For example, the instruction decoder for ALU core 220 may handle only ALU-related instructions, the instruction decoder for elementary function core 230 may handle only instructions for elementary functions, etc. Two-level decoding may simplify the design of central thread scheduler 310 as well as the instruction decoders for the hardware units.

Central thread scheduler 310 may perform various functions to schedule and manage execution of threads. Central thread scheduler 310 may determine whether to accept new threads from programs 110, dispatch threads that are for execution, and release/remove threads that are completed. For each thread, central thread scheduler 310 may determine whether resources (e.g., instructions, hardware units, register banks, texture read, etc.) required by that thread are available, activate the thread and place it in active queue 314 if the required resources are available, push the thread into sleep queue 316 if any resource is not available, and move the thread from sleep queue 316 to active queue 314 when all required resources become available. Central thread scheduler 310 may interface with load control unit 260 to synchronize the resources for the threads. Central thread scheduler 310 may also issue requests to load control unit 260 for outputting results of completed threads.

Central thread scheduler 310 may also manage execution of threads. In each scheduling interval, central thread scheduler 310 may select a number of candidate threads in active queue 314 for evaluation and possible dispatch. The number of candidate threads may be a subset of all of the threads in active queue 314 but may be larger than the number of hardware units. This provides central thread scheduler 310 with some freedom in selecting threads for dispatch in case of conflict among some candidate threads. Central thread scheduler 310 may determine the hardware units to use for instructions of the candidate threads, check for conflicts of read/write ports of register banks 270 as described below and, if there are no conflicts, dispatch instructions for different threads to different hardware units for execution. Central thread scheduler 310 may implement an arbitration scheme and select one thread[i] for ALU core 220, one thread[j] for elementary function core 230, one thread[k] for logic core 240, one thread[l] for texture sampler 250, and one thread[m] for load control unit 260, if these threads match the hardware units and there are no read/write port conflicts for register banks 270 or constant buffer 222.

Central thread scheduler 310 may update the status and state of threads as appropriate. Central thread scheduler 310 may place a thread in sleep queue 316 if (a) the next instruction for the thread is not found in instruction cache 214, (b) a sync bit is set in the next instruction and results of previous instructions are not available yet for the thread, or (c) some other sleep conditions are satisfied. Some instructions such as texture sampler and load/store instructions may have long and unpredictable latency. Other instructions may be dependent on these "long" instructions with unpredictable latency. Each such dependent instruction may have its sync bit set to indicate that it is dependent on a long instruction, and may be placed in sleep queue 316 until the long instruction is completed. Upon placing a thread in sleep queue 316, central thread scheduler 310 may select another active thread for possible dispatch to the hardware units. Central thread scheduler 310 may restore a thread in sleep queue 316 back to active queue 314 when the sleep conditions are no longer true, e.g., the long latency instruction is completed.

Central thread scheduler 310 may also place a thread in a wait state, which is a temporary state in which the thread is not assigned resources. For example, the thread may be placed in the wait state if a no operation (NOP) instruction is being executed. While the thread is in the wait state, central thread scheduler 310 may reassign the hardware unit for this thread to another thread. Central thread scheduler 310 may restore the thread from the wait state to an active state when the wait conditions are no longer true.

Central thread scheduler 310 may maintain a program counter for each thread and may update this program counter as instructions are executed or program flow is altered. Central thread scheduler 310 may solicit assistance from flow controller 212 to control the program flow for the threads. Flow controller 212 may handle if/else statements, loops, subroutine calls, branches, switch instructions, pixel kill and/or other flow altering instructions. Flow controller 212 may evaluate the one or more conditions for each such instruction, indicate a change in the program counter one way if the condition(s) are met, and indicate a change in the program counter another way if the condition(s) are not met. For a subroutine call, flow controller 212 may update the program counter (e.g., program counter+1), push the updated program counter into a stack prior to calling the subroutine, and restore the program counter from the stack after returning from the subroutine. Flow controller 212 may also perform other functions related to dynamic program flow. Central thread scheduler 310 may update the program counter based on results from flow controller 212. Central thread scheduler 310 may also handle special instructions such as, e.g., NOP, END, etc.

Central thread scheduler 310 may also manage context registers 320 and update these registers as threads are accepted, executed, and completed. Context registers 320 may store various types of information for threads. For example, a context register for a thread may store (1) a program identifier that indicates the program to which the thread belongs, (2) a program counter that points to the current instruction for the thread, (3) a coverage mask that indicates valid and invalid pixels for the thread, (4) an active flag that indicates which pixels to operate on in case of a flow altering instruction, (5) a resume instruction pointer that indicates when a pixel will be re-activated if it is inactive, (6) a stack that stores return instruction pointers for dynamic flow control, e.g., CALL, (7) address registers for relative addressing, (8) predicate registers that store condition calculation results, and/or (9) a load reference counter that tracks load requests and data back conditions. Context registers 320 may also store less, more, or different information.

Scheduling of multiple threads may be complex, and instruction fetching may become a bottleneck. Thread scheduler 210 may fetch/retrieve and decode instructions for a thread to determine which hardware unit to use for the thread. However, this may result in many redundant fetch and decode operations if these instructions are not dispatched after the first fetch and decode operation, e.g., due to hardware conflicts. The fetched instructions may be stored within thread scheduler 210 for later dispatch to avoid redundant fetches. In this case, more instruction storage space would be needed in thread scheduler 210 for each thread.

To simplify scheduling, instructions may be associated with hardware identifiers (HW IDs) that indicate which hardware units to use for the instructions. In the design shown in FIG. 2, ALU core 220 may be assigned HW ID1 (HW1), elementary function core 230 may be assigned HW ID2 (HW2), logic core 240 may be assigned HW ID3 (HW3), texture sampler 250 may be assigned HW ID4 (HW4), load control unit 260 may be assigned HW ID5 (HW5), and flow controller 212 may be assigned HW ID6 (HW6). The HW IDs may also be referred to as group IDs, instruction types, etc.

A pre-decoder may perform preliminary decoding of instructions, e.g., as they are loaded or updated into instruction cache 214. For each instruction, the pre-decoder may determine the instruction type, ascertain the HW ID for the instruction, and provide the HW ID to a tag RAM within instruction cache 214, as described below. Thread scheduler 210 may fetch the HW IDs for instructions of different candidate threads and use these HW IDs to make intelligent decisions on which thread to dispatch to each hardware unit. Thread scheduler 210 may thus perform scheduling based on the HW IDs and avoid fetching of instructions just for scheduling. Thread scheduler 210 may fetch instructions for threads that are actually dispatched, threads that are more likely to be dispatched in an upcoming time slot, etc.

Figure 4:
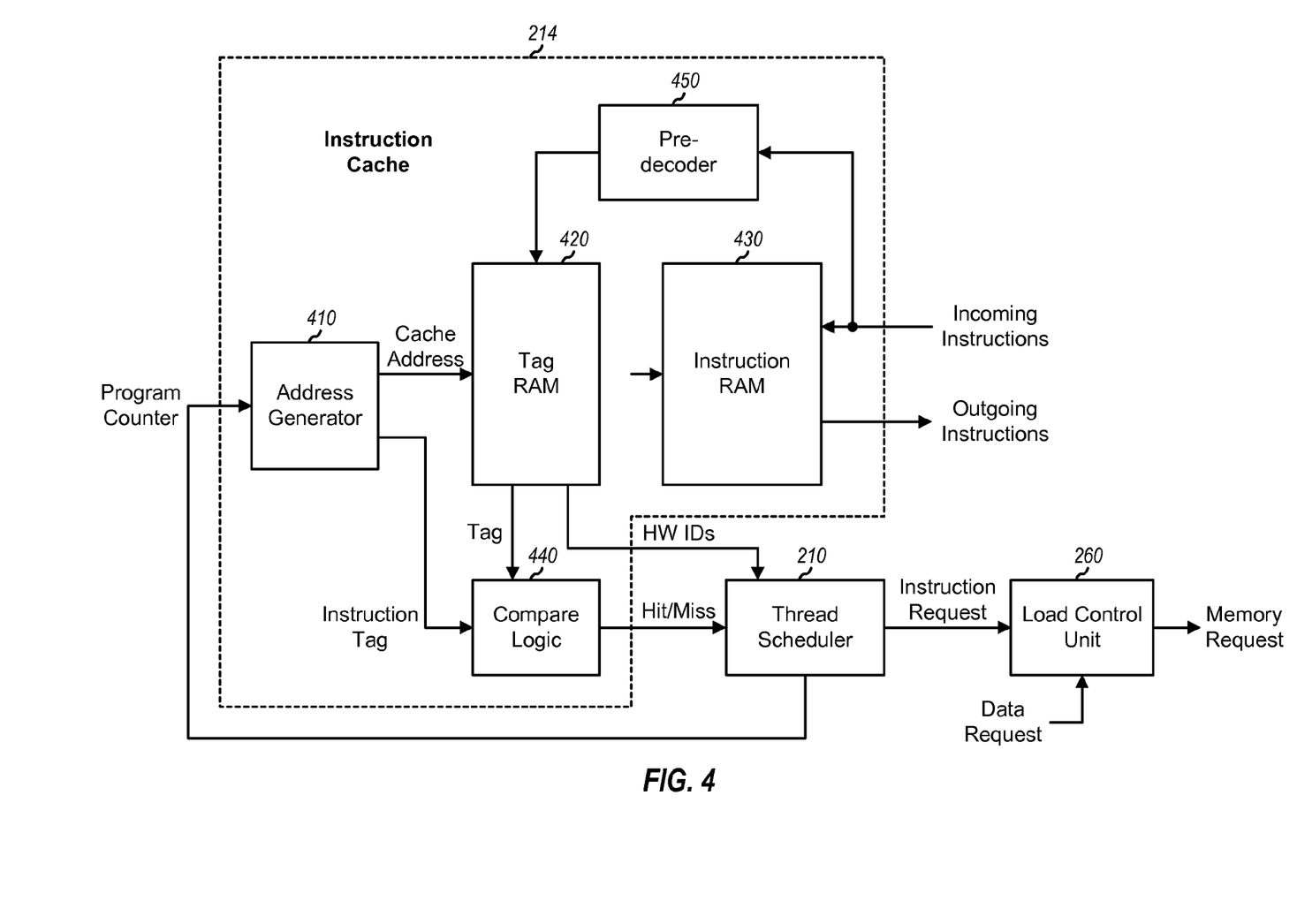
FIG. 4 shows an instruction cache within the shader core.

FIG. 4 shows a design of instruction cache 214, which includes an address generator 410, a tag RAM 420, an instruction RAM 430, compare logic 440, and a pre-decoder 450. Instruction RAM 430 stores instructions for threads and may be partitioned into multiple sections called tiles. Each tile may be assigned to a specific program and used to store instructions for that program. Tag RAM 420 stores tags that identify the instructions stored in instruction RAM 430. Compare logic 440 determines whether an instruction indicated by a program counter is stored in instruction RAM 430. Pre-decoder 450 receives instructions to be loaded or updated in instruction RAM 430, determines the HW IDs for these instructions, and provides the HW IDs to tag RAM 420.

Instruction RAM 430 may store instructions in cache lines. Each cache line may comprise a predetermined number of bits and may store a predetermined number of instructions, e.g., four instructions. A cache line may be filled from another memory (e.g., cache memory system 150) in one clock cycle. To improve instruction fetching throughput, thread scheduler 210 may fetch all instructions in an entire cache line at a time from instruction RAM 430.

Instruction RAM 430 may store instructions for a program using a direct mapped scheme that maps each instruction to a specific location within instruction RAM 430. The program may be divided into sequentially numbered sections, with each section having a size determined by the size of the tile (or the cache size) allocated to the program. Each instruction in a given section of the program is mapped to a specific location of the tile allocated to the program. For example, the first instruction in each section of the program may be mapped to the first location of the tile, the second instruction in each section may be mapped to the second location of the tile, etc., and the last instruction in each section may be mapped to the last location of the tile. In general, instruction x of the program may be mapped to location y of the tile, where y=(x mod M), M is the tile size, and MOD M denotes a modulo-M operation.

The direct mapped scheme reduces the number of compare operations in order to determine whether a desired instruction is stored in instruction RAM 430. Since the desired instruction can be stored in only one location, only one compare operation may be performed to determine whether the desired instruction is stored in instruction tag 430. An N-way set associate scheme may also be used in which each instruction of the program may be mapped to any one of N possible locations in the tile. For clarity, the following description is for the direct mapped scheme.

A program counter may be divided into three parts: (a) an instruction tag composed of A most significant bits (MSBs) of the program counter, (b) a cache address composed of B next most significant bits, and (c) an offset composed of C least significant bits (LSBs). C is determined by the size of each cache line, e.g., C=2 if each cache line stores four instructions. B is determined by the size of the tile, in number of cache lines, e.g., B=7 if the tile contains 128 cache lines. A is determined by the program address space. The instruction tag identifies a specific section of the program, the cache address identifies a specific cache line within the section, and the offset identifies a specific location of the cache line for the instruction indicated by the program counter.

Address generator 410 receives the program counter, provides the corresponding cache address to tag RAM 420, and provides the instruction tag to compare logic 440. Tag RAM 420 receives the cache address and provides a tag stored for this cache address. This tag indicates the specific section of the program currently stored in instruction RAM 430 for the cache address. Compare logic 440 receives the stored tag from tag RAM 420 and the instruction tag from address generator 410. Compare logic 440 compares the two tags, indicates a cache hit if the two tags are equal, and indicates a cache miss otherwise. A cache hit means that the instruction indicated by the program counter is stored in instruction RAM 430.

Thread scheduler 210 may receive the cache miss/hit indicator from compare logic 440. For a cache hit, thread scheduler 210 may fetch instructions and HW IDs for an entire cache line from instruction RAM 430. For a cache miss, thread scheduler 210 may place the thread in sleep queue 316. Thread scheduler 210 may also issue a request to load the missing instructions immediately or may postpone the loading if this would improve performance. After the missing instructions have been loaded into instruction RAM 430, thread scheduler 210 may move the thread from sleep queue 316 and send another request to fetch the instructions and HW IDs for the thread.

Load control unit 260 may receive instruction requests from thread scheduler 210 and data requests from other units. Load control unit 260 may arbitrate these various requests and generate memory requests to load the desired instructions and/or data, e.g., from cache memory system 150 or main memory 160.

Figure 5:
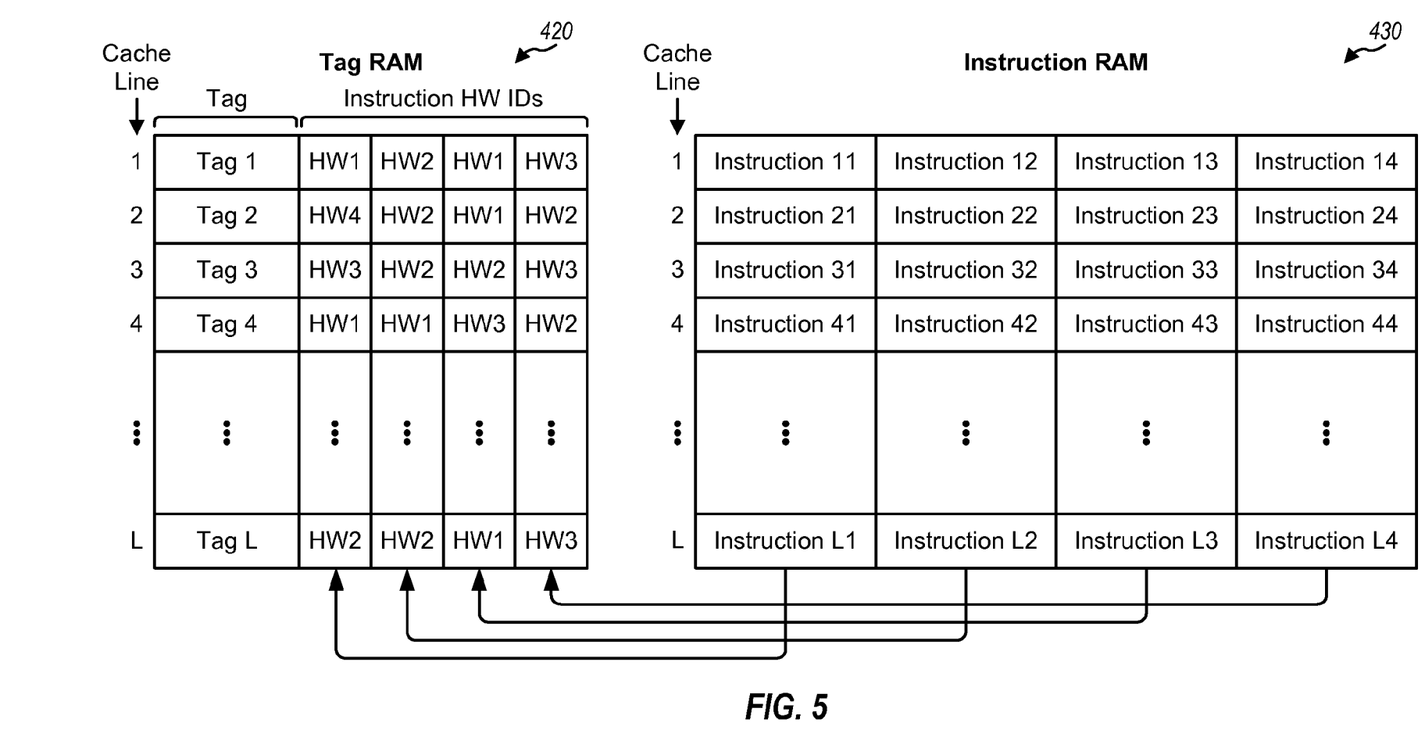
FIG. 5 shows a tag random access memory (RAM) and an instruction RAM within the instruction cache.

FIG. 5 shows a design of tag RAM 420 and instruction RAM 430 within instruction cache 214 in FIG. 4. In this design, instruction RAM 430 includes L cache lines, with each cache line including four instructions. In general, L may be any value. Tag RAM 420 includes L entries for the L cache lines, one entry for each cache line. The L entries and L cache lines may be indexed by the cache address from address generator 410 in FIG. 4.

In FIG. 5, each entry in tag RAM 420 includes a tag for an associated cache line and four HW IDs for the four instructions stored in the cache line. The tag indicates the specific program section containing the four instructions stored in the cache line. The four instructions are associated with four HW ID fields in the corresponding tag RAM entry, as indicated by the four lines at the bottom of FIG. 5. Each instruction is associated with a HW ID in the corresponding HW ID field. This HW ID indicates the hardware unit to use for the instruction. The number of bits for each HW ID field is determined by the number of hardware units. For the design shown in FIG. 2 with six hardware units, three bits may be used for each HW ID field, and a total of 12 bits may be used for the four HW ID fields for the four instructions in one cache line.

In FIG. 4, pre-decoder 450 may receive instructions to be loaded into instruction RAM 430, determine the hardware unit to use for each instruction, and provide the HW ID for each instruction to tag RAM 420. The HW IDs for the instructions stored in instruction RAM 430 may be dynamically determined and stored in tag RAM 420. This allows the same program to be executed on different hardware platforms. Pre-decoder 450 would then perform pre-decoding in accordance with a specific hardware platform. Alternatively, each instruction may include an op code that may be determined during compilation or some other time. The op code may be extracted from the instruction, translated to the HW ID, stored in the HW ID field, and used for scheduling.

The HW IDs stored in tag RAM 420 may be used to improve scheduling performance. Prior to fetching an instruction for a thread, its program counter may be used to determine whether the instruction is stored in instruction RAM 430. If there is a cache hit, then thread scheduler 210 may obtain the HW IDs for all instructions in a cache line without actually fetching these instructions. The HW IDs may be stored in the context register for the thread and used for scheduling. The instructions for only threads that are dispatched or threads that are more likely to be dispatched may be fetched, an entire cache line at a time, and saved in the context registers for these threads. This reduces unnecessary and redundant instruction fetches. The instructions for the dispatched threads may be sent in parallel from the context registers to the hardware units.

The design shown in FIGS. 4 and 5 may alleviate bottleneck in instruction fetching. Thread scheduler 210 may perform instruction look ahead and fetch HW IDs for scheduling, without having to fetch instructions. Thread scheduler 210 may also fetch multiple instructions at a time to improve throughput and may store the fetched instructions in the context registers.

Figure 6:
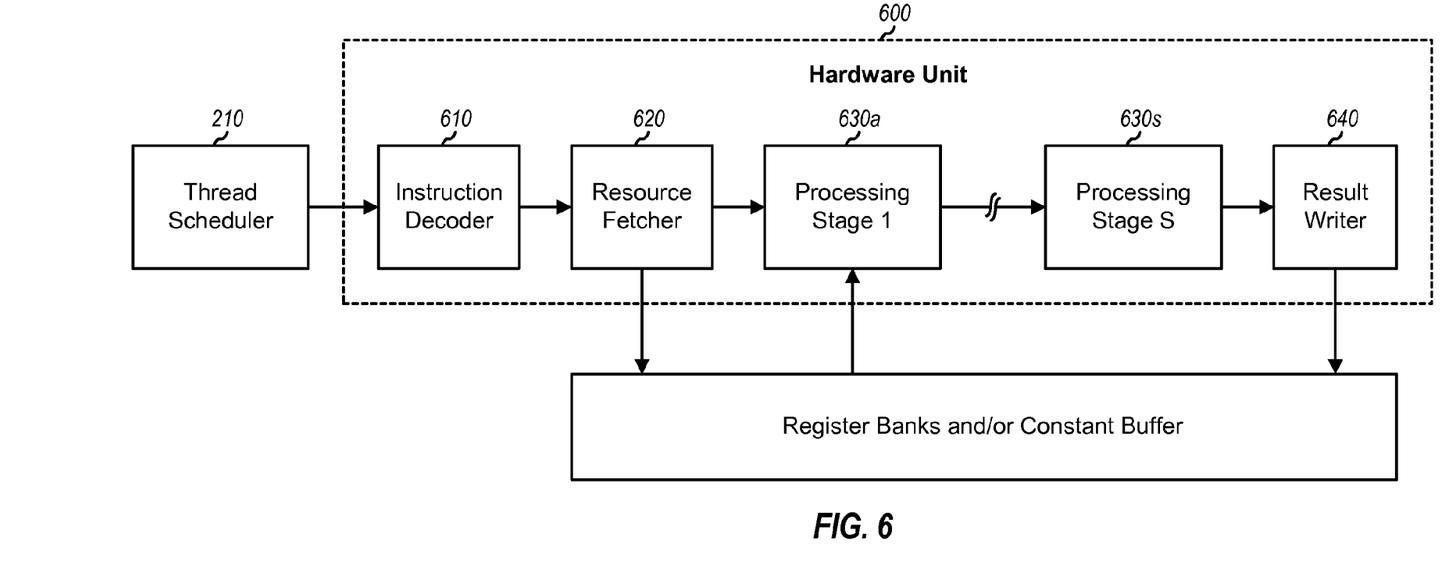
FIG. 6 shows a generic hardware unit.

FIG. 6 shows a design of a hardware unit 600, which may be any one of the hardware units in FIG. 2. In this example, hardware unit 600 includes an instruction decoder 610, a resource fetcher 620, S processing stages 630*a* through 630*s*, where S may be any value, and a result writer 640. The S processing stages 630 may be arranged in a pipeline as shown in FIG. 6 or in some other configuration.

Instruction decoder 610 receives instructions from thread scheduler 210 and performs low-level decoding on the received instructions. For each instruction, instruction decoder 610 may provide source identifiers (IDs) that indicate the locations of operands for the instruction, a destination identifier (ID) that indicates the location of the result for the instruction, and control signals that indicate the processing to be performed for the instruction.

Resource fetcher 620 fetches the operands for each instruction from register banks 270 and/or constant buffer 222. Processing stages 630*a* through 630*s* perform processing on the fetched operands for each instruction, as indicated by instruction decoder 610, and provide the result for the instruction. The processing by stages 630*a* through 630*s* is dependent on the hardware unit type and is generally different for different hardware units. For example, ALU core 220, elementary function core 230, logic core 240, texture sampler 250, and load control unit 260 would generally have different processing stages. Result writer 640 writes the result for each instruction to the proper location in register banks 270, as indicated by the destination ID from instruction decoder 610.

FIGS. 3 and 6 show a design of dual-level instruction decoding. A single high-level decoder 312 may perform high-level decoding for all instructions. Each hardware unit may have its own instruction decoder 610 that performs low-level decoding for instructions processed by that hardware unit. The dual-level decoding may simplify the scheduler design. Multi-level instruction decoding may also be performed in other manners.

Thread scheduler 210 is able to efficiently determine the hardware units to use for instructions of candidate threads based on the HW IDs for these instructions, without having to perform low-level decoding of the instructions. Thread scheduler 210 may perform a check for possible read/write conflicts of register banks 270 based on the available information, e.g., the HW IDs. Thread scheduler 210 may select and dispatch candidate threads having no detected read/write conflicts. Any actual read/write conflicts may not be known until the instructions for the dispatched threads are decoded and executed by the hardware units. Various techniques may be used to reduce the likelihood of read/write conflicts. For example, a compiler may store data in different register banks to reduce the possibility of bank conflict and/or may implement other techniques to reduce read port requirements.

In one design, to reduce the possibility of port conflicts, thread scheduler 210 may perform high-level decoding to determine the instruction type, operand type, and source/destination IDs, etc. for candidate threads for ALU core 220, elementary function core 230, and logic core 240. Thread scheduler 210 may skip decoding for texture sampler 250 and load control unit 260. Thread scheduler 210 may determine if there are any port conflicts among the candidate threads, select a set or subset of threads with no conflicts, and send the selected threads to ALU core 220, elementary function core 230, and logic core 240. The low-level decoding is performed in each hardware unit. If there are port conflicts, then arbitration may resolve these conflicts using various schemes, e.g., a scheme based on priority as described below.

Figure 7:
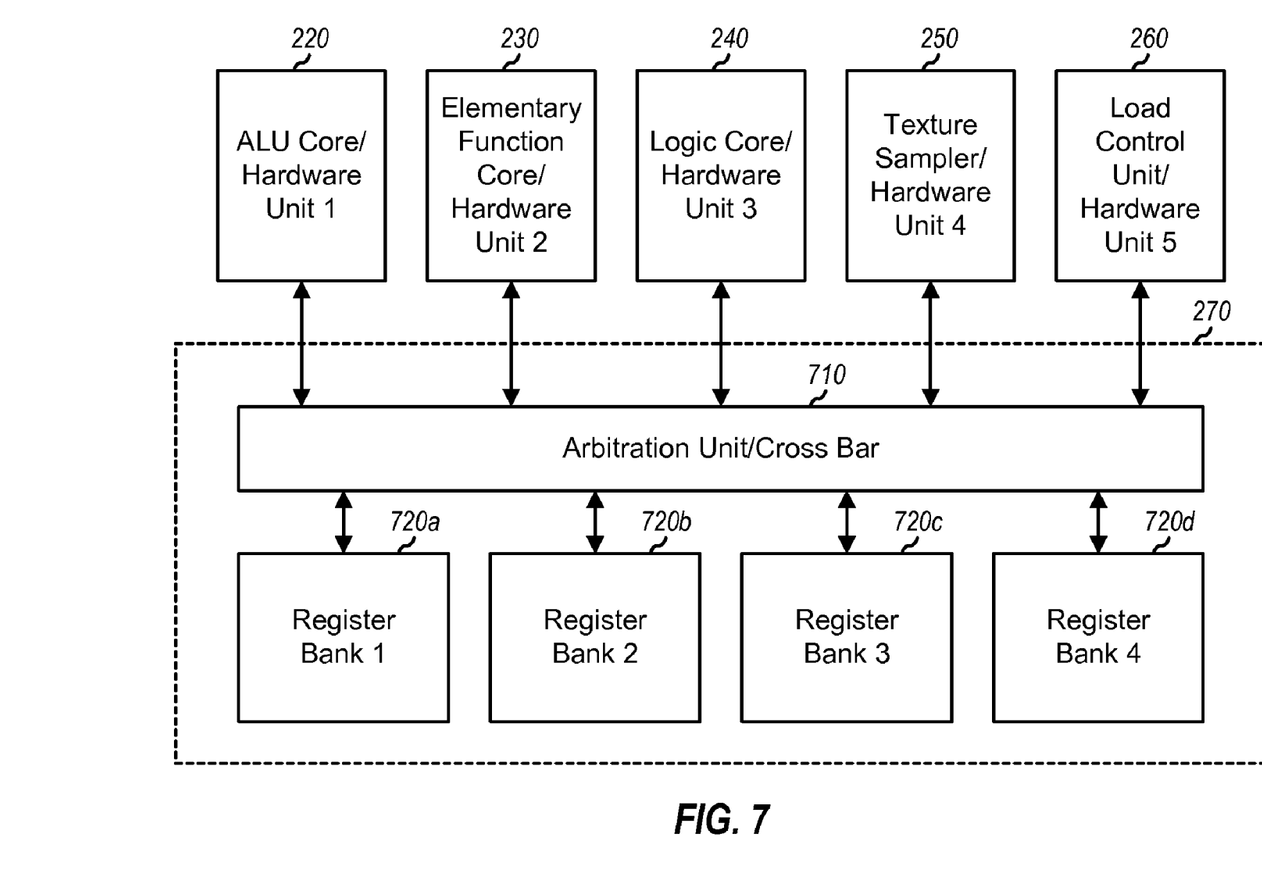
FIG. 7 shows register banks within the shader core.

FIG. 7 shows a design of register banks 270 in FIG. 2. In this design, register banks 270 includes an arbitration unit 710 and four register banks 720*a* through 720*d*. Arbitration unit 710 receives requests to access register banks 720 from the hardware units, arbitrates the requests from all competing hardware units based on an arbitration scheme, and grants access to the selected hardware units. Arbitration unit 710 may also include a crossbar that couples the selected hardware units to register banks 720*a* through 720*d*.

The hardware units may be assigned different priorities with respect to access of register banks 270. For example, ALU core 220 may be assigned the highest priority, elementary function core 230 may be assigned the second highest priority, etc., and load control unit 260 may be assigned the lowest priority. Arbitration unit 710 may then grant access to the register banks based on the priorities of the hardware units. Thread scheduler 210 may use various mechanisms for handling variable latency in texture sampler 250 and load control unit 260. For example, thread scheduler 210 may place a thread that is dispatched to load control unit 260 in sleep queue 316 and/or may use sync bits to maintain data consistency. Thus, assigning load control unit 260 with the lowest priority, which may result in the longest latency as well as the most variation in latency, may least impact performance. Other arbitration schemes may also be used, e.g., a first come first serve scheme.

Thread scheduler 210 may temporarily suspend threads, e.g., if they cannot gain access to register banks 270 because of low priority. The suspended threads may have longer latency and may use sync bits in order to maintain data consistency.

A 2-D or 3-D image may be represented with polygons (typically triangles). Each triangle may be composed of pixels. Each pixel may have various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a pixel. Texture coordinates are typically given by horizontal and vertical coordinates, u and v. A pixel may also be associated with other attributes.

The four register banks 720a through 720d may efficiently store the components for pixels as described below.

Figure 8:
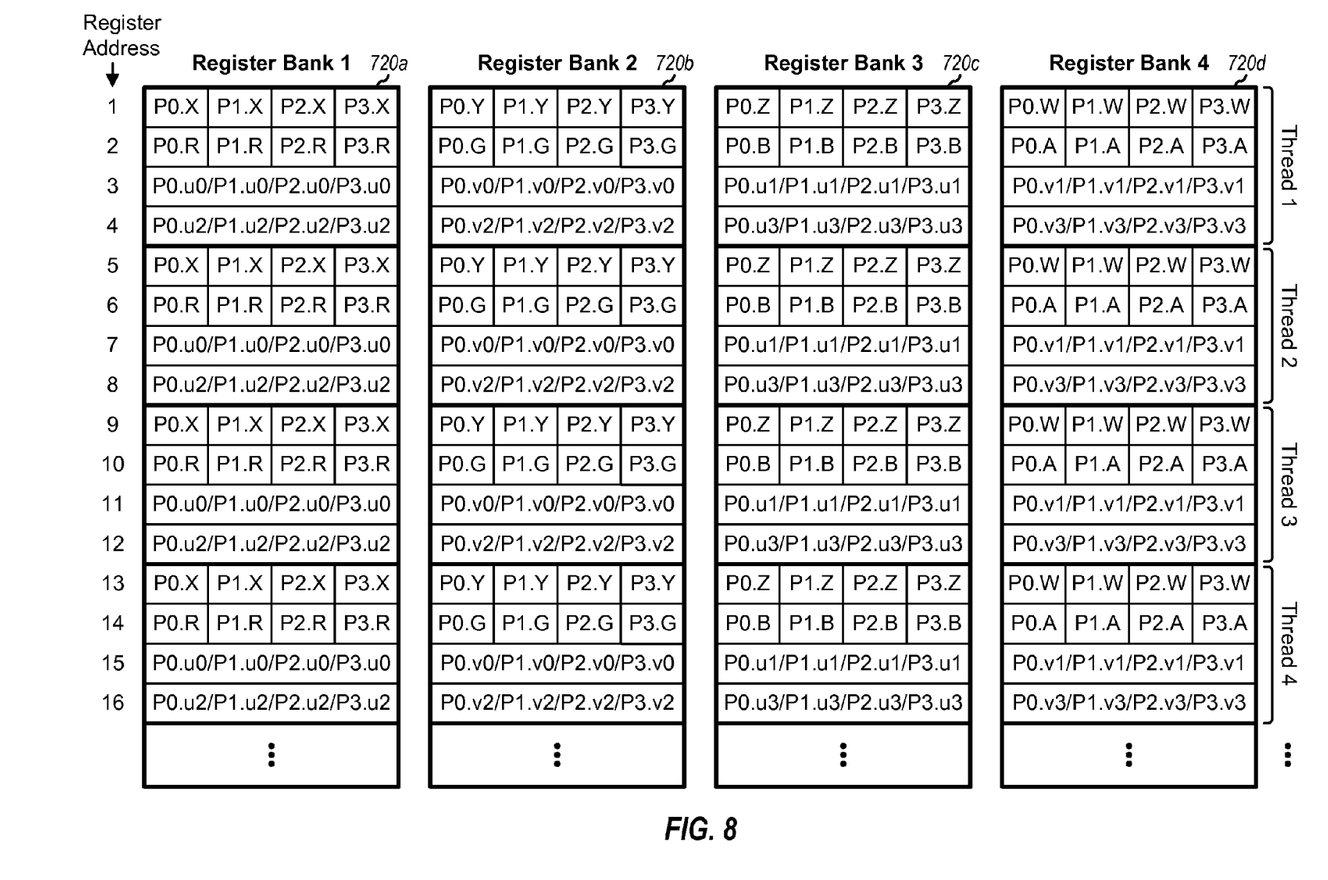
FIG. 8 shows four register banks storing different components for pixels.

FIG. 8 shows a design of register banks 720a through 720d in FIG. 7. In this design, each register bank 720 stores a different component of space coordinates, a different component of color values, and one component of texture coordinates. For example, register bank 720a may store horizontal (x) space coordinate, red (r) color value, and horizontal (u) texture coordinate. Register bank 720b may store vertical (y) space coordinate, green (g) color value, and vertical (v) texture coordinate. Register bank 720c may store depth (z) space coordinate, blue (b) color value, and horizontal (u) texture coordinate. Register bank 720d may store homogeneous (w) space coordinate, transparency (a) color value, and vertical (v) texture coordinate. This design supports efficient fetching of data by the hardware units and efficient storage of results from the hardware units. In general, the data for pixels may be stored in any manner, e.g., each register bank 720 may store all components of an attribute for a pixel.

Each thread may be allocated a sufficient number of registers in the four register banks 720a through 720d. In the example shown in FIG. 8, each thread includes data for four pixels, which are denoted as P0, P1, P2 and P3. For thread 1, horizontal space coordinates for the four pixels (P0.X, P1.X, P2.X and P3.X) are stored in register 1 of register bank 720a, red color values for the four pixels (P0.R, P1.R, P2.R and P3.R) are stored in register 2 of register bank 720a, horizontal texture coordinates for the four pixels (P0.u0, P1.u0, P2.u0 and P3.u0) are stored in register 3 of register bank 720a, and horizontal texture coordinates for the four pixels (P0.u2, P1.u2, P2.u2 and P3.u2) are stored in register 4 of register bank 720a. u0 and v0, u1 and v1, u2 and v2, and u3 and v3 are texture coordinates for four texture maps that may be used for texturing. The other components of the four pixels for thread 1 are stored in registers 1 through 4 of register banks 720b, 720c and 720d, as shown in FIG. 8. The components of the pixels for thread 2, 3 and 4 are also stored in the four register banks 720a through 720d, as shown in FIG. 8.

All four register banks 720a through 720d may be accessed (read from and/or written to) simultaneously. In general, each register bank 720 may include any number of read ports and any number of write ports. For example, each register bank 720 may include two read ports and two write ports. The two read ports support (a) two read operations with absolute addressing in one clock cycle or (b) two read operations in a staggered manner with relative addressing. The two write ports supports (a) two write operations with absolute addressing in one clock cycle or (b) two write operations in a staggered manner with relative addressing. Four register banks, each with two read ports and two write ports, support peak throughput of 8 read and 8 write operations per clock cycle. The use of multiple register banks and multiple read/write ports provides high access throughput to support all of the hardware units.

The graphics processor described herein may provide various advantages. Thread scheduler 210 can obtain HW IDs for instructions and perform scheduling based on the HW IDs without having to fetch these instructions, which avoids redundant instruction fetches and extra storage for instructions. Thread scheduler 210 can also fetch tag RAM 420 and instruction RAM 430 one cache line (instead of one instruction) at a time, which improve fetch throughput. The hardware units may be operated in parallel for different threads to improve efficiency and overall throughput.

Design complexity and logic costs are also kept low by the efficient modular design of the hardware units and the instruction decoders and by sharing common resources such as instruction cache 214 and register banks 270. Each hardware unit may be assigned to instructions for the same thread or different threads in successive time slots. The latency of the hardware units is hidden by the ability to interleave different threads. For threads with interdependent instructions, the hardware units for these threads may be assigned to other threads while waiting for results from earlier instructions. This way, the hardware units may be efficiently utilized for a larger percentage of the time.

The graphics processor and techniques described herein may be used for wireless communication, computing, networking, personal electronics, etc. The techniques may be implemented on graphics processors, graphics processing units (GPUs), digital signal processors (DSPs), reduced instruction set computers (RISCs), advanced RISC machines (ARMs), controllers, microprocessors, etc. An exemplary use of the graphics processor and techniques for wireless communication is described below.

Figure 9:
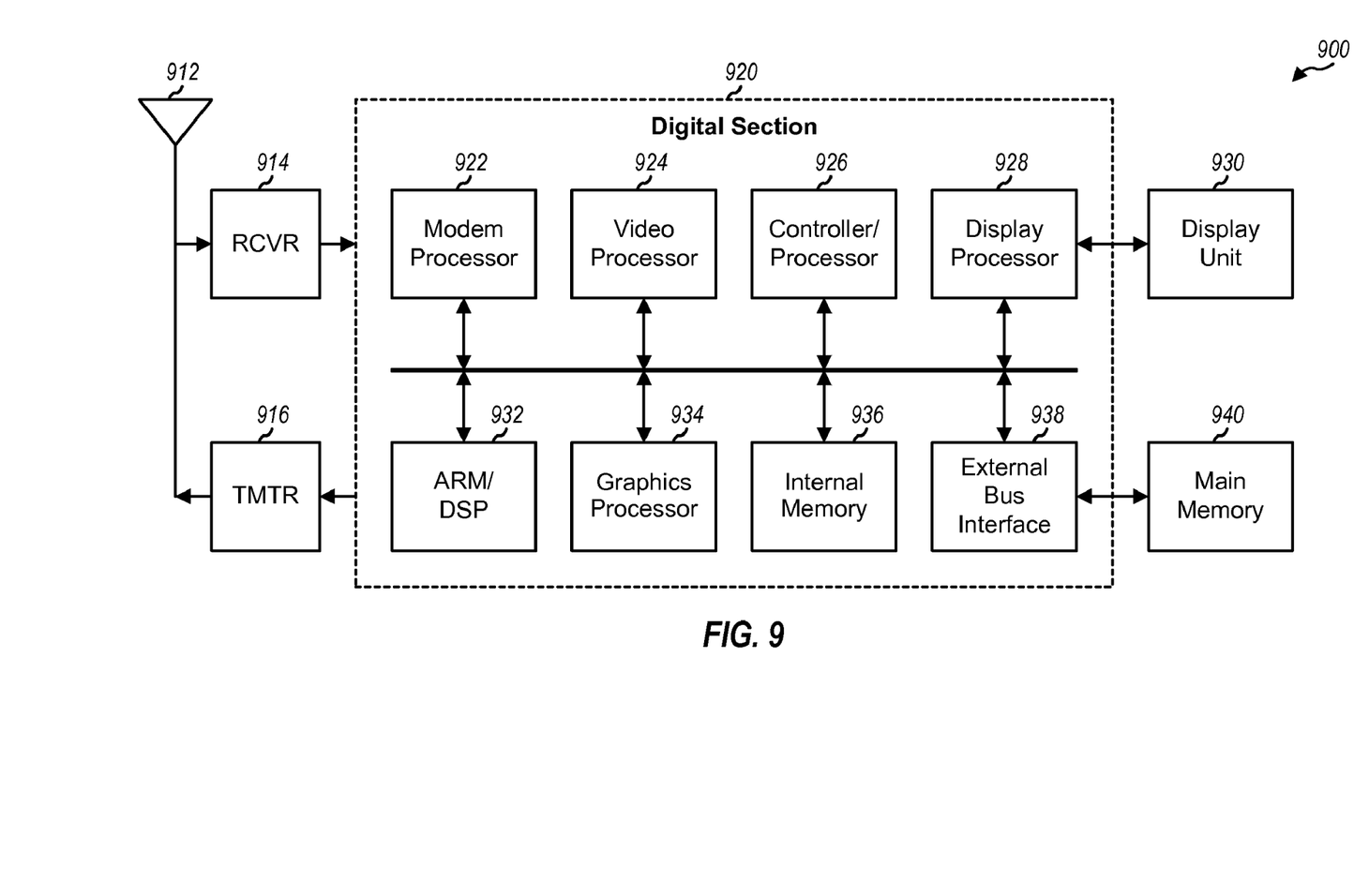
FIG. 9 shows a block diagram of a wireless device.

FIG. 9 shows a block diagram of a wireless device 900 in a wireless communication system. Wireless device 900 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 900 is capable of providing bi-directional communication via a receive path and a transmit path. On the receive path, signals transmitted by base stations are received by an antenna 912 and provided to a receiver (RCVR) 914. Receiver 914 conditions and digitizes the received signal and provides samples to a digital section 920 for further processing. On the transmit path, a transmitter (TMTR) 916 receives data to be transmitted from digital section 920, processes and conditions the data, and generates a modulated signal, which is transmitted via antenna 912 to the base stations.

Digital section 920 includes various processing, interface and memory units such as, for example, a modem processor 922, a video processor 924, a controller/processor 926, a display processor 928, an ARM/DSP 932, a graphics processor 934, an internal memory 936, and an external bus interface (EBI) 938. Modem processor 922 performs processing for data transmission and reception (e.g., encoding, modulation, demodulation, and decoding). Video processor 924 performs processing on video content (e.g., still images, moving videos, and moving texts) for video applications such as camcorder, video playback, and video conferencing. Controller/processor 926 may direct the operation of various processing and interface units within digital section 920. Display processor 928 performs processing to facilitate the display of videos, graphics, and texts on a display unit 930. ARM/DSP 932 may perform various types of processing for wireless device 900. Graphics processor 934 performs graphics processing and may be implemented as shown in FIG. 2. Internal memory 936 stores data and/or instructions for various units within digital section 920. EBI 938 facilitates transfer of data between digital section 920 (e.g., internal memory 936) and a main memory 940.

Digital section 920 may be implemented with one or more DSPs, micro-processors, RISCs, etc. Digital section 920 may also be fabricated on one or more application specific integrated circuits (ASICs) or some other type of integrated circuits (ICs).

The graphics processor and techniques described herein may be implemented by various means, e.g., in hardware, firmware, software, or a combination thereof. For a hardware implementation, the graphics processor and techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, and other electronic units.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein.

What is claimed is:

1. A graphics processor comprising:
   a plurality of hardware units operable to execute instructions in parallel and independently of one another, each of the plurality of hardware units supporting a respective set of operations, wherein each of the plurality of hardware units comprises a different hardware unit relative to other ones of the plurality of hardware units; and
   a scheduler operable to dispatch instructions for multiple threads to the plurality of hardware units concurrently,
   wherein each of the plurality of hardware units executes one instruction independently of the other ones of the plurality of hardware units, and performs a different operation corresponding to the one instruction executed by the respective one of the plurality of hardware units.

2. The graphics processor of claim 1, wherein the plurality of hardware units comprises an arithmetic logic unit (ALU) core, an elementary function core, a logic core, or a combination thereof.

3. The graphics processor of claim 1, wherein the plurality of hardware units comprises a texture sampler, a load control unit, a flow controller, or a combination thereof.

4. The graphics processor of claim 1, wherein the scheduler is operative to receive threads for at least one graphics program and to schedule and manage execution of the threads.

5. The graphics processor of claim 4, wherein the scheduler is operative to place threads ready for execution in an active queue, to place threads not ready for execution in a sleep queue, and to schedule the threads in the active queue for dispatch to the plurality of hardware units.

6. The graphics processor of claim 5, wherein the scheduler is operative to move the threads in the sleep queue from the sleep queue to the active queue when resources for the threads become available.

7. The graphics processor of claim 1, wherein the scheduler is operative to accept new threads for processing, to release completed threads, and to synchronize resources for active threads.

8. The graphics processor of claim 1, wherein the scheduler is operative to evaluate candidate threads for possible dispatch, to determine hardware units to use for the candidate threads, and to select candidate threads without hardware conflicts as the multiple threads to dispatch to the plurality of hardware units.

9. The graphics processor of claim 8, wherein the scheduler is operative to evaluate more candidate threads than a number of the hardware units and to select a subset of the candidate threads as the multiple threads to dispatch.

10. The graphics processor of claim 8, wherein the scheduler is operative to obtain hardware identifiers for instructions of the candidate threads and to determine the hardware units to use for the candidate threads based on the hardware identifiers.

11. The graphics processor of claim 10, wherein the scheduler is operative to fetch the hardware identifiers for the instructions of the candidate threads from an instruction cache, and to fetch instructions for the selected candidate threads from the instruction cache.

12. The graphics processor of claim 1, wherein the scheduler is operative to perform high-level decoding of instructions for candidate threads to determine instruction type, operand type, source identifiers, destination identifier, or a combination thereof.

13. The graphics processor of claim 1, wherein each of the plurality of hardware units comprises an instruction decoder operative to decode instructions dispatched to the respective hardware unit.

14. The graphics processor of claim 1, wherein each of the plurality of hardware units comprises at least one processing stage operative to perform the set of operations supported by the respective hardware unit.

15. The graphics processor of claim 1, further comprising:
   an instruction cache operative to store instructions for threads accepted by the scheduler and to store hardware identifiers for the stored instructions.

16. The graphics processor of claim 1, further comprising:
   a plurality of register banks operative to store data for the plurality of hardware units and being shared by the plurality of hardware units.

17. The graphics processor of claim 1, further comprising:
   a plurality of context registers operative to store information for threads accepted by the scheduler.

18. The graphics processor of claim 17, wherein a context register for a thread stores a program counter indicating a current instruction for the thread, the program counter being updated as instructions for the thread are executed.

19. The graphics processor of claim 17, wherein a context register for a thread comprises a stack for storing return instruction pointers for dynamic flow control of the thread, and at least one address register used for relative addressing for the thread.

20. The graphics processor of claim 17, wherein a context register for a thread comprises a coverage mask indicative of valid and invalid pixels for the thread, an active flag indicative of which pixels to operate on in case of a flow altering instruction, a resume instruction pointer indicative of when a pixel will be re-activated if it is inactive, predicate registers for storing condition calculation results, or a combination thereof.

21. The graphics processor of claim 1, wherein the graphics processor utilizes two-level decoding of instructions, high-level decoding in the scheduler to make determinations regarding which of the plurality of hardware units should execute each of the dispatched instructions and low-level decoding in each of the plurality of hardware units to make determinations that are hardware unit function-specific.

22. The graphics processor of claim 1, further comprising a pre-decoder to perform preliminary decoding of instructions to determine information associated with the instructions, wherein the scheduler utilizes the information to dispatch the instructions.

23. The graphics processor of claim 22, wherein the pre-decoder determines a hardware unit to use for each of the instructions.

24. An integrated circuit comprising:
   a plurality of hardware units operable to execute instructions in parallel and independently of one another, each of the plurality of hardware units supporting a respective set of operations, wherein each of the plurality of hardware units comprises a different hardware unit relative to other ones of the plurality of hardware units; and a scheduler operable to dispatch instructions for multiple threads to the plurality of hardware units concurrently, wherein each of the plurality of hardware units executes one instruction independently of the other ones of the plurality of hardware units, and performs a different operation corresponding to the one instruction executed by the respective one of the plurality of the hardware units.

25. The integrated circuit of claim 24, wherein the scheduler is operative to evaluate candidate threads for possible dispatch, to determine hardware units to use for the candidate threads, and to select candidate threads without hardware conflicts as the multiple threads to dispatch to the plurality of hardware units.

26. The integrated circuit of claim 25, wherein the scheduler is operative to obtain hardware identifiers for instructions of the candidate threads and to determine the hardware units to use for the candidate threads based on the hardware identifiers.

27. A method comprising:
selecting candidate threads for evaluation from among threads ready for execution;
determining hardware units to use for the candidate threads;
selecting candidate threads without hardware conflicts;
dispatching instructions for the selected candidate threads to a plurality of hardware units for parallel execution, wherein each of the plurality of hardware units comprises a different hardware unit relative to other ones of the plurality of hardware units,
wherein the hardware units of the plurality of hardware units are operable to execute the instructions in parallel and independently of one another, wherein each of the plurality of hardware units executes one instruction independently of the other ones of the plurality of hardware units, and performs a different operation corresponding to the one instruction executed by the respective one of the plurality of the hardware units.

28. The method of claim 27, wherein determining the hardware units to use for the candidate threads comprises:
obtaining hardware identifiers for instructions of the candidate threads, and
determining the hardware units to use for the candidate threads based on the hardware identifiers.

29. A wireless device comprising:
a graphics processor operative to perform graphics operations and comprising a plurality of hardware units operable to execute instructions in parallel and independently of one another, each of the plurality of hardware units supporting a respective set of operations, wherein each of the plurality of hardware units comprises a different hardware unit relative to other ones of the plurality of hardware units, and
a scheduler operable to dispatch instructions for multiple threads to the plurality of hardware units concurrently,
wherein each of the plurality of hardware units executes one instruction independently of the other ones of the plurality of hardware units, and performs a different operation corresponding to the one instruction executed by the respective one of the plurality of the hardware units.

30. The wireless device of claim 29, wherein the graphics processor further comprises an instruction cache operative to store instructions for threads accepted by the scheduler and to further store hardware identifiers for the stored instructions.

* * * * *